United States Patent [19]

Clough et al.

[11] Patent Number: 4,850,778
[45] Date of Patent: Jul. 25, 1989

[54] PUSH-ON FASTENER

[75] Inventors: Melvyn J. L. Clough, Acton; Stephen P. Mackowiak, Leominster; Jeffrey C. Lewis, Hubbardston, all of Mass.

[73] Assignee: TRW, Inc., Cleveland, Ohio

[21] Appl. No.: 225,041

[22] Filed: Jul. 27, 1988

[51] Int. Cl.⁴ .................... F16B 37/08; F16B 19/00
[52] U.S. Cl. .................... 411/433; 411/182; 411/324; 411/437; 411/512
[58] Field of Search .................. 411/181, 40, 42, 429, 411/433, 437, 512, 508–510, 324, 947, 182, 267, 270

[56] References Cited

U.S. PATENT DOCUMENTS

| | | |
|---|---|---|
| 3,910,156 | 10/1975 | Soltysik . |
| 4,367,995 | 1/1983 | Mizusawa . |
| 4,435,111 | 3/1984 | Mizusawa . |
| 4,460,298 | 7/1984 | Solarz . |
| 4,521,148 | 6/1985 | Tanaka . |
| 4,557,649 | 12/1985 | Jeal ......................... 411/181 |
| 4,570,303 | 2/1986 | Richmond . |
| 4,571,136 | 2/1986 | Peek ......................... 411/512 |
| 4,579,493 | 4/1986 | Schaty . |
| 4,600,344 | 7/1986 | Sutenbach . |
| 4,671,717 | 6/1987 | Fukuhara ................... 411/437 |
| 4,756,654 | 7/1988 | Clough . |

Primary Examiner—Neill R. Wilson
Attorney, Agent, or Firm—Fay, Sharpe, Beall, Fagan, Minnich & McKee

[57] ABSTRACT

A molded plastic, push-on fastener for connection to threaded studs or the like comprises first and second cylindrical collar members. The first collar has a resilient side wall and threads are formed on the interior thereof in a form and size for positive engagement with the threads on the associated threaded stud. The second collar member has a relatively rigid side wall with an open interior diameter which is greater than the diameter of the first collar member to permit the second member to be received over and surround the first member. A thin frangible, connecting web is provided for temporarily connecting the collar members in axial alignment. Cooperating interengaging thread forms are formed on the exterior of the first collar member and the interior of the second collar member. These interengaging thread forms act to inhibit radial expansion of the first collar member while simultaneously preventing axial withdrawal of the second member in a direction off the first member after the second member has been moved from the temporarily connected position to an installed position received over and surrounding the first collar member.

12 Claims, 2 Drawing Sheets

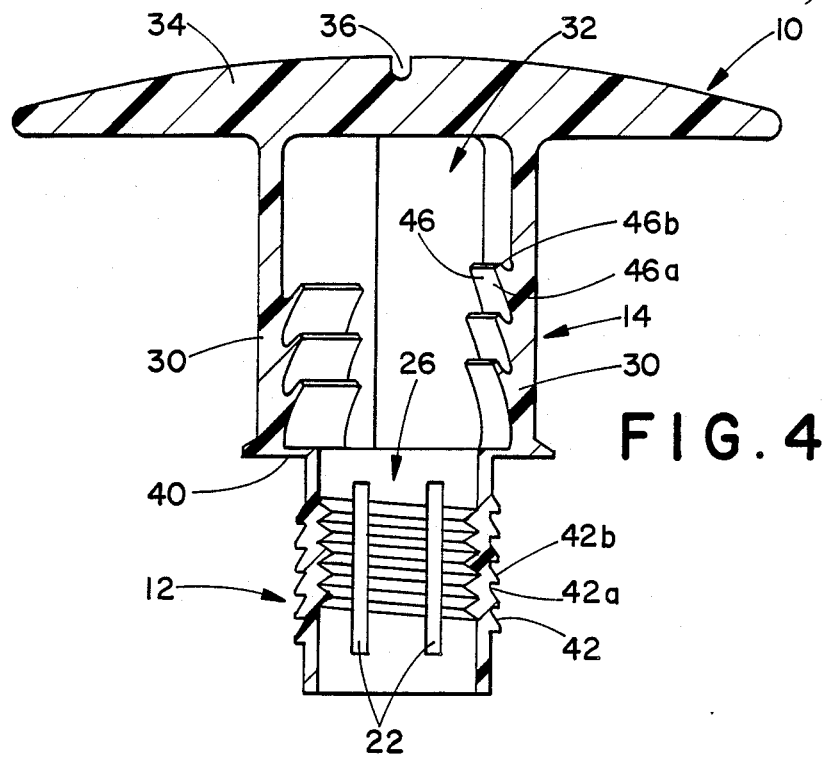
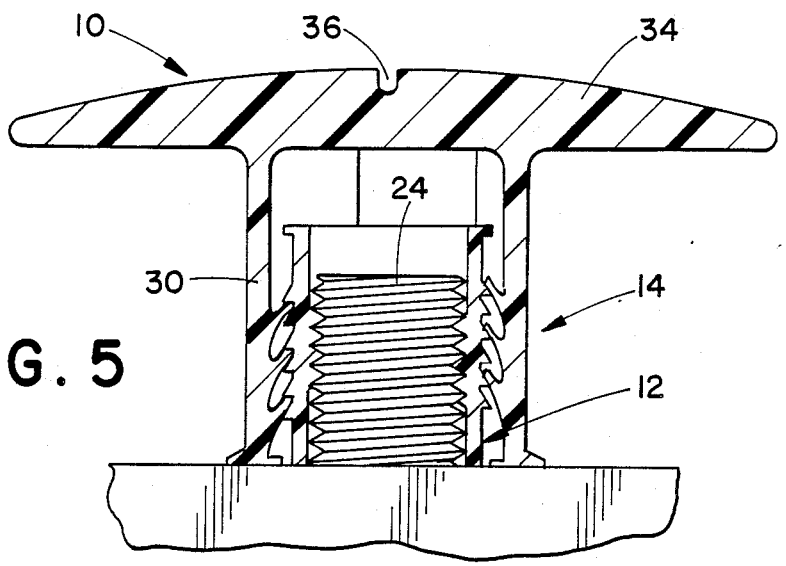

PUSH-ON FASTENER

BACKGROUND OF THE INVENTION

The subject invention is directed toward the fastener art and, more particularly, to a push-on type fastener for use on threaded studs and the like.

The invention is particularly suited for attaching decorative panels or insulation to a base frame having threaded studs welded thereon and will be described with particular reference to such use. As will become apparent, however, the invention is capable of broader application and could be used for attaching many different structures or components to bolts, studs and similar threaded elements.

In the automotive industry, insulation and sound proofing materials must be installed on both horizontal and vertical panels. The installation is sometimes made by the use of nuts or similar fasteners received on threaded stud members welded to substructure or panels in the application area. It would be desirable in most instances if a push-on type fastener or nut could be used for such installation rather than a nut or fastener which must be rotatably threaded onto the threaded studs.

In the commonly assigned U.S. Pat. 4,756,654 issued July 12, 1988 for "Fastening Device" there is disclosed a push-on type fastener which has a low push-on force and a very high pull-off force when used with threaded studs. To achieve a desirable high range of pull-off forces, the thread form on the studs should have a preferred shape. Often, however, the studs encountered in use have a shallow, widely spaced and/or inconsistent 60° form which does not provide ideal mating with the fastener of the noted patent. Consequently, the desirable high levels of pull-off force are sometimes not achieved.

BRIEF SUMMARY OF THE INVENTION

The subject invention provides a push-on fastener which overcomes the noted problems and achieves an extremely high resistance to pull-off. The fastener is, however, capable of being readily disconnected through a standard unthreading operation. In addition, the fastener of the invention can function well on standard 60 thread forms, but can also be readily adapted to a variety of other thread forms.

In particular, according to the subject invention, the push-on fastener is arranged for connection to threaded studs or the like and comprises a first cylindrical collar member having first and second ends and a resilient side wall. Threads are formed on the interior of the resilient side wall in a form and size for positive engagement with the threads on the associated threaded stud. Associated with the first cylindrical collar member is a second generally cylindrical collar member which has a relatively rigid side wall with first and second ends. The second collar member has an open interior diameter which is greater than the diameter of the first cylindrical collar member to permit the second collar member to be received over and surround the first collar member. Connecting means are provided for temporarily joining the second end of the first collar member to the second end of the second collar member with the collar members in axial alignment. Cooperating interengaging means are formed on the exterior of the resilient side wall of the first cylindrical collar member and the interior of the rigid side wall of the second collar member. These interengaging means act to limit or inhibit radial expansion of the first collar member while simultaneously preventing axial withdrawal of the second collar member in a direction off the second end of the first collar member after the second member has been moved from the temporarily connected position to a position received over and surrounding the first collar member. In use, the resilient wall of the first collar member allows it to be readily pushed on over the end of the associated stud. As the second collar member is pushed over the first collar member, the interengaging means interlock and act to limit or inhibit radial expansion or deflection of the first collar member thereby locking it firmly to the threaded stud. Because the thread form on the interior of the first collar member is arranged to correspond to the shape of the thread on the stud, a full positive engagement is achieved between the stud and the first collar member.

Preferably, and in accordance with a more limited aspect of the invention, the connecting means between the first and second collar members comprises a frangible web which maintains them in a properly aligned position but which can break as the fastener is axially moved onto the associated threaded stud.

Preferably, the interengaging means between the exterior of the first collar member and the interior of the second collar member comprise cooperating thread forms with the threads on at least one of the two members being resilient and readily deflectable in a direction to allow the second collar member to be readily moved into position over the first collar member. In addition, the thread forms are preferably such that when the second collar member is in position, axial withdrawal is prevented and the two fastener collar components can be disconnected only by a standard unthreading operation. Of course, when the second collar member is removed from the first collar member, the first collar member can be removed from the associated stud either by an unthreading operation or a simple axial pull-off since it has an extremely resilient side wall and can readily deflect in radial directions except when the second collar member is in position.

In accordance with a further and more limited aspect of the invention, the second collar member preferably has a closed first end with a substantial radially extending head carried thereon. The enlarged head allows the second collar member to function in the nature of a nut or the like for retaining material in position on the threaded stud.

Accordingly, a primary object of the subject invention is the provision of a push-on type of fastener which can function with a wide variety of threaded studs or the like and wherein the forces resisting pull-off of the fastener can be extremely high.

Yet another object of the invention is the provision of a fastener of the type described which allows high resistance to pull-off to be achieved even when the threads on the associated threaded stud or the like have a shallow, widely spaced, and/or inconsistent thread form.

The above and other objects and advantages of the invention will become apparent from the following description when read in conjunction with the accompanying drawings wherein:

FIG. 4 is a vertical cross-sectional view taken through the fastener of FIG. 1 at a 45° angle as best illustrated 4—4 of FIG. 2; and, FIG. 5 is a cross-sectional view showing the fastener of FIGS. 1 through 4 installed on a threaded stud member.

Figure 1:
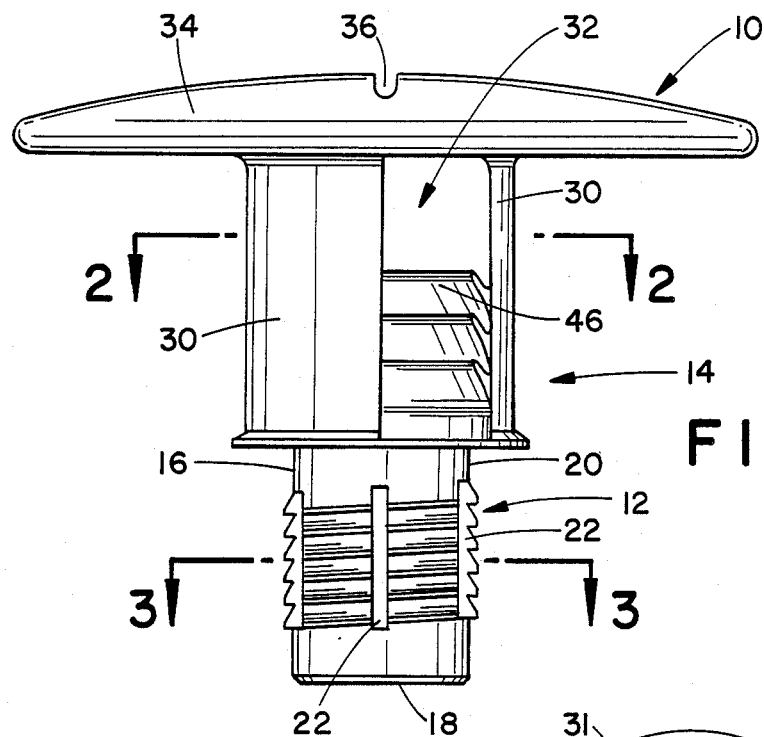
FIG. 1 is a side elevational view of a push-on type fastener formed in accordance with the preferred embodiment of the invention.
Figure 2:
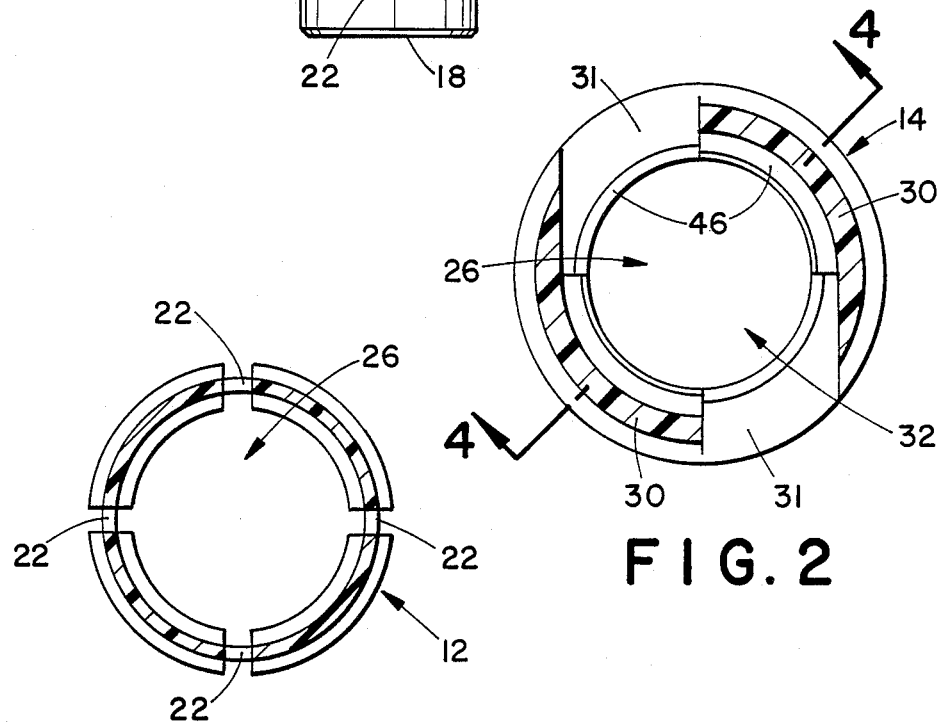
FIG. 2 is a cross-sectional view taken on line 2—2 of FIG. 1.
Figure 3:
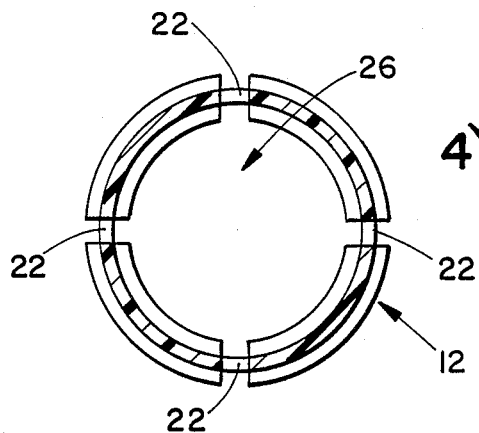
FIG. 3 is a somewhat enlarged cross-sectional view taken on line 3—3 of FIG. 1.

Referring more particularly to the drawings wherein the showings are for the purpose of illustrating a preferred embodiment of the invention only and not for the purpose of limiting same, FIGS. 1 through 4 illustrate the overall arrangement of a push-on type fastener 10 which is molded as an integral, one-piece structure from a suitable resinous plastic material such as nylon, polyethylene, or the like. The fastener 10 is designed to be received on the end of a threaded stud, rod, bolt or similar threaded or grooved element with a simple axial push-on motion. That is, the fastener can be moved into its connected position merely by axially pushing the fastener onto the threaded element associated therewith.

As more particularly illustrated in the drawings, the fastener 10 comprises cooperating first and second generally cylindrical collar members 12 and 14, respectively. The collar member 12 includes a resilient, radially deflectable or expansible side wall 16 which extends from a first open end 18 to a second end 20. The radial flexibility and/or expansibility of the side wall 16 is enhanced by four vertically extending slots or openings 22.

In the embodiment under consideration, the first collar member 12 is designed to be closely received over an associated threaded stud or the like 24 (see FIG. 5). For this reason, the internal diameter of the central opening 26 of the collar member 12 is only slightly larger than the exterior diameter of the associated stud or bolt 24. Carried on the interior of the side wall 16 is a thread form 25 which is sized and shaped to closely mate with threads on the stud or bolt 24.

As can be appreciated, the radial flexibility or expansibility of the first collar 12 allows it to be placed on the associated stud or bolt 24 by a simple axial pushing action. Of course, it should be understood that the same radial flexibility allows the first collar to be readily removed from the stud by a simple axial pull-off operation. For this reason, the second collar member 14 is arranged to function in a manner to limit or inhibit radial expansion of the first collar member 12 after it has been installed in position on the associated threaded stud. Consequently, the second collar member 14 has a relatively rigid side wall 30 which is also of generally cylindrical configuration. Access openings 31 are formed through diagonally opposite sides of the wall 30. These openings result from the tooling used in molding the fastener and form no part of the invention.

A central opening 32 extends axially of the collar 14 and the side wall 30. The opening 32 is sized to relatively closely receive collar 12. In the embodiment illustrated, the first or upper end of the side wall 30 is generally closed by an enlarged radially extending head member 34. It should, of course, be understood that the head member 34 could have a variety of designs or configurations or comprise a separate element or assembly such as a pipe or wire holder depending upon the intended use for the fastener 10. In the subject embodiment, the head 34 includes a transversely extending slot 36 adapted to receive a screw driver or the like.

The first and second collar members 12, 14, respectively, are joined at their respective second ends in a manner to permit them to at least temporarily retain the aligned position illustrated in FIG. 4. Many different types of temporary connecting means could be provided to perform this function. In the subject embodiment, however, the connecting means comprise a thin radially extending web of plastic 40 which is molded in place simultaneously with the molding of the fastener 10. The web 40 is sized and arranged such that after the first collar member 12 has been moved into position on the end of the threaded stud as shown in FIG. 5, further axial force applied to the second collar member 14 causes the web to break and the member 14 to move into located position over the collar 12 as shown in FIG. 5.

In order to maintain the second collar member locked in position on the first collar member in the assembled relationship shown in FIG. 5, the two collar members are provided with cooperating interengaging means. The interengaging means of the invention could have many designs but in the subject embodiment comprise cooperating thread forms which are generally of the type shown and described in the commonly assigned U.S. Pat. 4,756,654 which is incorporated herein by reference. In particular, the exterior of the collar member 12 is provided with a first continuous spiral of threads 42 which preferably have somewhat of a buttress shape with a generally horizontal first wall 42a and an inclined mating wall 42b (See FIG. 4). The interior of the collar member 14 is provided with a continuous cooperating thread form in the configuration best shown in FIGS. 1 and 4. The threads 46 formed on the interior of the side walls 30 are relatively resilient and are inclined in a direction away from the second or lower end of the opening 32. As noted earlier, the preferred form and shape for these resilient finger like threads is more fully described and shown in the aforementioned commonly assigned U.S. Patent Generally, however, they include a first face 46a which is inclined somewhere in the range of approximately 30° relative to the axis of the fastener. A second wall 46b inclined at an angle in the range of approximately 45° joins wall 46a at the apex of the thread form. The arrangement allows the threads to readily flex in a direction away from the lower end of the fastener. Thus, as the fastener is pushed on to the threaded stud the position shown in FIG. 5, the individual thread forms 46 can deflect upwardly and pass over the individual threads 42 on the exterior of the collar member 12. However, once the threads 46 have passed over the individual threads 42, attempts at axially withdrawing the sleeve member 14 are strongly resisted. Additionally, while in the final located position shown in FIG. 5, the threads 46 and the rigid side walls 30 of the collar member 14 maintain the first collar member 12 firmly locked in engagement with the threaded stud 24. Thus, axial withdrawal of the push-on fastener 10 is generally not possible and removal can be accomplished only by a conventional unthreading operation. During the rotation or unthreading of the member 10 the greater surface contact between the interior of the collar member 12 and the exterior of the threaded stud 24 produce a greater friction than is present between the exterior of collar member 12 and the interior of collar member 14. Thus, during the unthreading operation, the collar member 12 remains in position on the stud. Of course, after the collar member 14 has been removed the collar member 12 can be removed either by axial pull-off or unthreading from the stud.

As can be seen from the foregoing, the subject fastener has the ability to work on standard thread forms and produce a high resistance to pull-off. In addition, the fastener can be molded in one piece and after installation can be removed by a simple unthreading operation. Further, the individual components of the fastener can be separated to facilitate subsequent serviceability of the assembly.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A push-on fastener for connection to a threaded stud comprising:
   a first cylindrical collar member having first and second open ends and a relatively resilient side wall, threads formed on the interior of said resilient side wall of a form and size for positive engagement with the threads on said threaded stud;
   a second generally cylindrical collar member having a relatively rigid side wall with first and second ends, said second collar member having an open interior diameter greater than the exterior diameter of said first cylindrical collar member to permit said second collar member to be received over and surround said first collar member;
   connecting means for temporarily joining the second end of said first collar member to the second end of said second collar member with said collar members in axial alignment; and,
   cooperating interengaging means on the exterior of the resilient side wall of said first cylindrical collar member and the interior of said rigid side wall of said second collar member for inhibiting radial expansion of said first collar member while simultaneously preventing axial withdrawal of said second collar member in a direction off the second end of said first collar member after the second member has been moved from the temporarily connected position to a position received over and surrounding said first collar member.

2. The push-on fastener as defined in claim 1 wherein said second collar member has a radially extending head portion formed on its first end.

3. The push-on fastener as defined in claim 1 wherein said connecting means comprise a frangible web extending between said first and second collar members.

4. The push-on fastener as defined in claim 1 wherein said cooperating interengaging means comprise thread forms formed on the exterior of the resilient side wall of said first collar member and the interior of the second collar member.

5. The push-on fastener as defined in claim 4 wherein the thread form formed on the interior of the second collar member comprises a series of resilient finger members which are inclined in a direction away from said second end of said second collar member.

6. The push-on fastener as defined in claim 1 wherein said connecting means comprises a thin, frangible wall extending radially outwardly from the second end of said first collar member into engagement with the second end of the second collar member.

7. The push-on fastener as defined in claim 1 wherein said second collar member has a closed first end with a radially extending head carried thereon.

8. A push-on fastener for connection to a threaded stud or the like comprising:
   a first collar member having a relatively resilient side wall terminating first and second ends with said first end opening inwardly to a passageway sized to closely receive threaded stud, said passageway having threads formed therein with a form and size for positive engagement with the threads on said threaded stud;
   a second collar member having a rigid sidewall terminating in first and second ends with an opening extending inwardly from said second end, said opening sized to closely receive said first collar member axially therein;
   connecting means for temporarily joining the second end of said first collar member to the second end of said second collar member with said collar members in axial alignment and said first collar member located out of said opening; and,
   cooperating interengaging means on the exterior of said resilient side wall and the interior of said rigid side wall of said second collar member for preventing radial expansion of said first collar member while simultaneously inhibiting axial withdrawal of said second collar member in a direction off said second end of said first collar member after the second member has been moved from the temporarily connected position to a position received over and surrounding said first collar member.

9. The push-on fastener of claim 8 wherein said first collar member has a cylindrical exterior.

10. The push-on fastener of claim 8 wherein said second collar member is generally cylindrical in shape and wherein said first end of said second collar member includes a radially extending head portion.

11. The push-on fastener of claim 8 wherein said cooperating interengaging means comprise mating sets of thread forms formed on the exterior of the resilient side wall of said first collar member and the interior of said second collar.

12. The push-on fastener of claim 11 wherein at least one set of said mating sets of thread forms comprises resilient finger-like members.

* * * * *